United States Patent
Maciejewski et al.

(10) Patent No.: US 8,091,472 B2
(45) Date of Patent: Jan. 10, 2012

(54) POST-SUPPORTED COVERS FOR FOOD TRAYS

(75) Inventors: Michael M. Maciejewski, St. Charles, IL (US); Keith Dice, Naperville, IL (US); Loren J. Veltrop, Chicago, IL (US); Jack Guasta, Glendale Heights, IL (US)

(73) Assignee: Prince Castle, Inc., Carol Stream, IL (US)

( * ) Notice: Subject to any disclaimer, the term of this patent is extended or adjusted under 35 U.S.C. 154(b) by 929 days.

(21) Appl. No.: 12/109,429

(22) Filed: Apr. 25, 2008

(65) Prior Publication Data
US 2009/0266244 A1    Oct. 29, 2009

(51) Int. Cl.
*F27D 11/00*    (2006.01)
(52) U.S. Cl. ............................ 99/483; 219/385; 426/418
(58) Field of Classification Search ............ 99/483, 99/467, 468; 219/385, 399; 426/418
See application file for complete search history.

(56) References Cited

U.S. PATENT DOCUMENTS

| | | |
|---|---|---|
| 3,751,629 A | 8/1973 | Eisler |
| 5,783,803 A | 7/1998 | Robards, Jr. |
| 5,900,173 A | 5/1999 | Robards, Jr. |
| 6,116,154 A | 9/2000 | Vaseloff |
| 6,175,099 B1 | 1/2001 | Shei et al. |
| 6,262,394 B1 | 7/2001 | Shei et al. |
| 6,412,403 B1 | 7/2002 | Veltrop |
| 6,541,739 B2 | 4/2003 | Shei et al. |
| 6,637,322 B2 | 10/2003 | Veltrop |
| 6,878,391 B2 | 4/2005 | Veltrop |
| 6,884,451 B2 | 4/2005 | Veltrop |
| 7,105,779 B2 | 9/2006 | Shei |
| 7,227,102 B2 | 6/2007 | Shei |
| 7,328,654 B2 | 2/2008 | Shei |
| 7,385,160 B2 | 6/2008 | Jones |
| 7,858,906 B2 * | 12/2010 | Veltrop et al. ............... 219/385 |
| 2001/0007322 A1 | 7/2001 | Shei et al. |
| 2002/0100756 A1 * | 8/2002 | Veltrop ...................... 220/200 |
| 2002/0121509 A1 | 9/2002 | Shei et al. |
| 2003/0118706 A1 | 6/2003 | Veltrop |
| 2008/0302778 A1 | 12/2008 | Veltrop et al. |
| 2009/0090252 A1 * | 4/2009 | Ewald et al. .................... 99/483 |
| 2009/0126580 A1 * | 5/2009 | Hartfelder et al. .............. 99/483 |
| 2009/0199725 A1 | 8/2009 | Veltrop et al. |
| 2011/0083564 A1 * | 4/2011 | Kirby et al. ..................... 99/468 |

OTHER PUBLICATIONS

Prince Castle, Inc., Operating Instructions, Dedicated Holding Bin, DHB2-20 Series, 2006.

(Continued)

*Primary Examiner* — Raleigh W. Chiu
(74) *Attorney, Agent, or Firm* — McDonnell Boehnen Hulbert & Berghoff LLP

(57) ABSTRACT

A food warming apparatus includes one or more heating compartments that can hold one or more trays, each covered by a cover, each tray containing previously cooked food portions. One or more supports are disposed inside a heating compartment. A support includes one or more guide members and one or more stop members. A cover includes one or more engagement sections. Without a tray, the cover rests on the one or more stop members. When a tray is inserted into the receiving space defined by the cover and the support, the cover is lifted. The one or more engagement sections engage the one or more guide members to guide the upward motion of the cover. The cover then rests on the tray to at least partially block an open top of the tray, thereby restricting evaporation of liquids from the previously cooked food portions contained therein.

16 Claims, 16 Drawing Sheets

OTHER PUBLICATIONS

Prince Castle, Inc., Product Specifications, DHB2PT-20 Dedicated Holding Bin, 2006.

Office Action, dated Jan. 5, 2010, in U.S. Appl. No. 11/760,308.
Office Action, dated Jul. 9, 2010, in U.S. Appl. No. 11/760,308.

* cited by examiner

POST-SUPPORTED COVERS FOR FOOD TRAYS

BACKGROUND OF THE INVENTION

1. Field of the Invention

This invention relates to the field of food preparation. More particularly, this invention relates to an apparatus and method for maintaining in a ready-to-use condition cooked food portions that are contained in a food tray and covered by a cover.

2. Description of Related Art

In many establishments, such as fast food restaurants, certain food items are cooked well in advance of when they are ordered by or served to the customer. Examples of such food items can include sandwich fillings, such as cooked eggs, hamburger patties, breaded foods, such as chicken nuggets, or baked goods, such as muffins. These previously cooked food portions are often maintained in a ready-to-use condition until they served to the customer. This typically involves maintaining the previously cooked food portions at a serving temperature in the range of from about 140° F. to about 200° F., depending on the food item.

Various food warming apparatus have been developed to maintain previously cooked food items at a desired serving temperature. Such food warming apparatus are sometimes referred to as staging cabinets, holding cabinets, or warming cabinets. One of the challenges associated with food warming apparatus is being able to preserve the flavor, appearance, and texture of the previously cooked food items while they are being maintained at the desired serving temperature. In particular, certain types of food items, such as cooked eggs and hamburger patties have a tendency to dry out undesirably when they are kept warm for extended periods of time.

One commonly used way to protect previously cooked food items for which drying out is a concern, is to place the food items in a container, such as a tray, and to provide a cover for the container. The cover restricts evaporation of moisture from the previously cooked food items. With a reduced amount of moisture vapor being able to escape from the covered container, the previously cooked food items contained therein do not dry out as rapidly.

Conventional covers are inconvenient to use in food fast restaurants and similar establishments. This is because when previously cooked food portions are taken from the food warming apparatus, the cover typically must be removed from the tray to gain access to the food items contained therein, and must be replaced to protect the remaining food portions contained in the tray. The steps of removing and replacing a cover can take an amount of time that is unacceptably large in fast food restaurants. The removed cover can also become misplaced or contaminated and can get in the way of other activities in the kitchen area.

SUMMARY

In a first principal aspect, an exemplary embodiment provides a food warming apparatus for maintaining previously cooked food portions contained in at least one tray in a ready-to-use condition. The food warming apparatus comprises a cabinet having at least one heating compartment therein. At least one support is disposed in the at least one heating compartment. The support has at least one stop member and at least one guide member. At least one cover rests in a first position on the at least one stop member. The at least one cover and the support cooperatively define at least one receiving space within the at least one heating compartment for receiving the at least one tray. The at least one cover has at least one engagement section that engages the at least one guide member such that the at least one guide member is able to guide upward movement of the at least one cover from the first position to a second position when the at least one tray is inserted into the at least one receiving space.

In a second principal aspect, an exemplary embodiment provides a method for covering a tray in a food warming apparatus. The food warming apparatus includes a heating compartment. The tray has a lip defining a tray opening. In accordance with the method, a support that fits into the heating compartment is provided. The support has at least one stop member and at least one guide member. A cover for the tray is provided. The cover has at least one engagement section for engaging the at least one guide member. The cover is mounted on the support in a first position such that the cover rests on the at least one stop member and the at least one engagement section engages the at least one guide member. The support with the cover mounted thereon is inserted into the heating compartment such that the cover and the support cooperatively define a receiving space within the heating compartment for receiving the tray. The tray is inserted into the receiving space until the cover is in a second position in which the cover rests on the lip of the tray and at least partially blocks the tray opening.

DETAILED DESCRIPTION OF EXEMPLARY EMBODIMENTS

1. Overview

Figure 1:
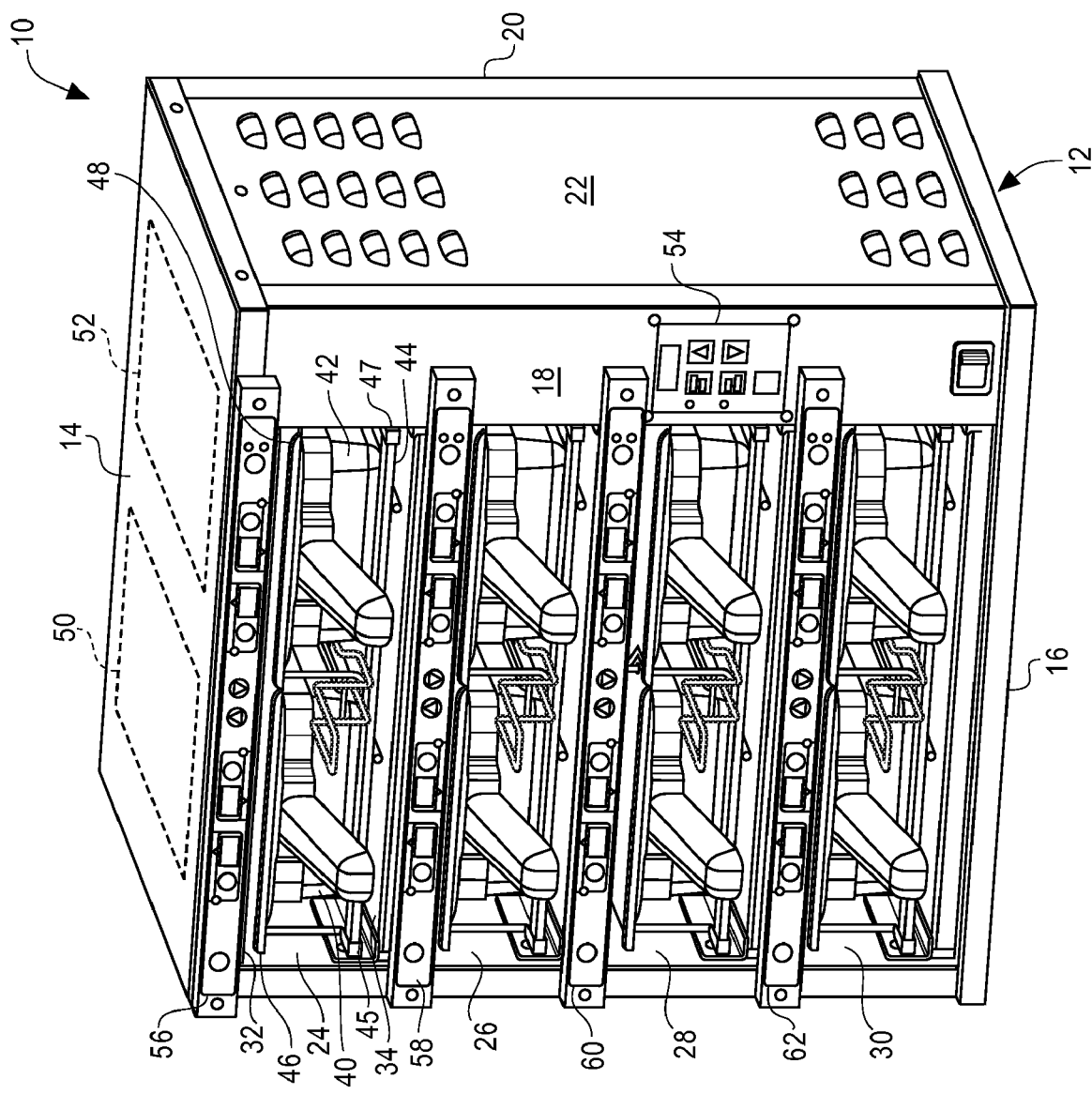
FIG. 1 is an isometric view of a food warming apparatus, in accordance with an exemplary embodiment.

A food warming apparatus is able to maintain previously cooked food portions in a ready-to-use condition. The previously cooked food portions may be placed in one or more open-top containers, which are referred to herein as "trays." The trays containing the previously cooked food portions may be placed in one or more heating compartments to maintain the portions at a desired temperature. The food warming apparatus may have a cabinet with one or more heating compartments and may also have one or more heater plates for heating the one or more heating compartments. Covers may cover some or all of the trays in the heating compartments and restrict evaporation of moisture or other liquid from the previously cooked food portions.

One or more supports may be placed in the heating compartments to support covers independently of the trays. A support may have one or more guide members and one or more stop members. The one or more supports may be part of a unitary support structure, such as a rack. With no tray present, a cover may rest on the one or more stop members in a resting position. In this position, the cover and support cooperatively define a receiving space for receiving a tray.

The cover may be fashioned with one or more engagement sections. The one or more engagement sections may engage the one or more guide members so that the guide members guide upward and downward motion of the cover. For example, the cover may move upwardly, guided by the one or more guide members, when a tray is inserted into the receiving space. The cover may move downwardly, guided by the one or more guide members, when the tray is withdrawn. Further, when the tray is completely removed, the cover may stay inside the compartment.

Thus, a tray containing previously cooked food portions may be placed in the heating compartment by inserting it in the receiving space. As the tray is inserted, the guide members may engage the one or more engagement sections of the cover, so as to guide the upward motion of the cover. Once the tray is fully inserted, the cover at least partially blocks the open top of the tray and restricts evaporation of liquid from the previously cooked food portions contained in the tray. For example, a tray may have a lip that defines the tray opening, such that when the tray is fully inserted into the receiving space, cover rests on the lip of the tray.

When a tray is withdrawn from the heating compartment, the cover may drop from its position on the lip of the tray to the resting position. As the tray is withdrawn, the guide members may engage the one or more engagement sections of the cover, so as to guide the downward motion of the cover. When the tray is fully removed, the cover may stay in the heating compartment in its resting position, i.e., resting on the one or more stop members.

Configuring the covers so that they stay in the heating compartment can provide benefits for establishments such as fast food restaurants. In particular, a tray containing previously cooked food portions may be inserted into the heating compartment and covered in one step, and the tray may be withdrawn from the heating compartment and uncovered in one step, thereby saving time. In addition, the inconvenience and the possibilities of contamination associated with direct handling of covers can be reduced.

2. Exemplary Food Warming Apparatus

With reference to FIG. 1, an exemplary food warming apparatus 10 includes a housing or cabinet 12 that has a top 14, a bottom 16, a front 18, a back 20, and sides 22. The interior of cabinet 12 is divided into heating compartments 24, 26, 28, and 30. Although FIG. 1 shows exemplary food warming apparatus 10 with four heating compartments, it is to be understood that a food warming apparatus could be provided with a greater or fewer number of heating compartments.

In the example shown in FIG. 1, front 18 is open to provide access to compartments 24, 26, 28, and 30. However, it is to be understood that back 20 could also be open to provide access to compartments 24, 26, 28, and 30; for example, in a pass-through configuration. Each of compartments 24, 26, 28, and 30 includes an upper compartment surface and a lower compartment surface. Thus, heating compartment 24 includes upper compartment surface 32 and lower compartment surface 34, as shown in FIG. 1. Compartments 26, 28, and 30 may be similarly configured.

Each of compartments 24, 26, 28, and 30 is sized to accommodate one or more trays, as exemplified in FIG. 1 by trays 40 and 42 in heating compartment 24. Each of trays 40 and 42 are covered by covers 46 and 48, respectively. Although FIG. 1 shows two trays in each compartment, it is to be understood that the compartments may be sized to accommodate a greater or fewer number of trays. In addition, although FIG. 1 shows each compartment filled with its maximum number of trays, it is to be understood that a compartment might hold less than the maximum number of trays at any given time.

In each compartment, trays may be supported by a support structure such as a rack. For example, FIG. 1 shows trays 40 and 42 in heating compartment 24 supported by a post rack 44. The rack may be mounted in the heating compartment in various ways. For example, a rack could rest on the lower compartment surface. Alternatively, a rack could be supported above the lower compartment surface. In the example illustrated in FIG. 1, the rack in each compartment is supported above the lower compartment surface by mounting brackets disposed on the side walls of the compartment. Thus, compartment 24 is shown with mounting brackets 45 and 47 supporting post rack 44.

Each of heating compartments 24, 26, 28, and 30 may be heated by a respective heating system. In an exemplary embodiment, each heating system includes one or more resistive heaters for heating its respective compartment from above and/or from below. For example, heating compartment 24 may be heated through upper compartment surface 32 by heater plates 50 and 52, which may be positioned over trays 40 and 42, respectively. Heating compartment 24 may also be heated through lower compartment surface 34 by similar heater plates. Compartments 26, 28, and 30 may be heated in a similar manner.

Food warming apparatus 10 may include various controls for enabling an operator to control its operation and various indicators for displaying information to the operator. Some of the controls and indicators may be arranged in a control panel 54 disposed on front 18. Other controls and indicators may be arranged in interface bars 56, 58, 60, and 62, associated with compartments 24, 26, 28, and 30, respectively.

Control panel 54 may enable the operator to select setpoint temperatures for the compartment (or for specific trays in the compartments). A control system in food warming apparatus 10 may control the heating systems for the compartments (e.g., thermostatically) to achieve and maintain the setpoint temperatures. In an exemplary embodiment, the control system may measure the temperature at the heating system (e.g., at heater plate 50 or 52), so that the setpoint temperature corresponds to the temperature at the heating system. The temperature of the food inside of the covered tray in the compartment may be lower than the setpoint temperature. For example, it may be desirable to maintain previously cooked food portions at a temperature that may range from about 140° F. to about 200° F. To achieve this food temperature, the setpoint temperature may need to be as high as 400° F.

Interface bars 56, 58, 60, and 62 may each enable an operator to select a hold time for the respective compartment (or for a specific tray in the compartment) based, for example, on the particular food product contained in the compartment (or contained in a specific tray in the compartment). The operator may select the hold time by scrolling through a list of food products, each of which has been associated with a preset hold time. A display on the interface bar may display descriptions of the food products as the operator scrolls through the list and may then display a description of the selected food product.

When the selected food product is placed in the compartment, the operator may interact with the compartment's interface bar to start a timer. When the hold time has been reached, the compartment's interface bar may provide an indication to the operator. The operator may then replace the food product with fresh food product and interact with the interface bar to re-set the timer.

Figure 2:
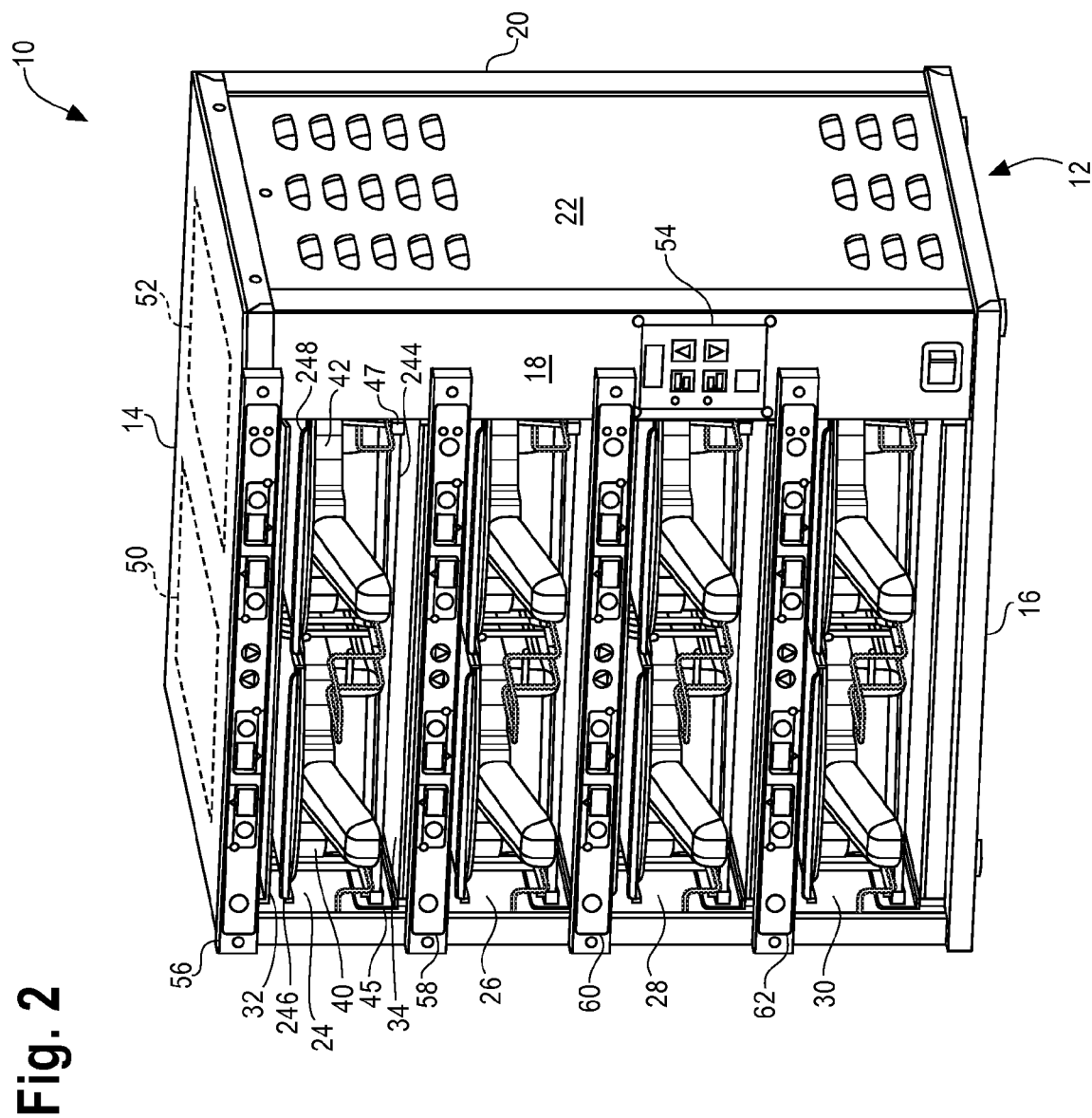
FIG. 2 is an isometric view of a food warming apparatus, in accordance with an exemplary embodiment.

FIG. 2 shows the exemplary food warming apparatus 10 with a loop rack 244. As with post rack 44, loop rack 244 may be mounted in heating compartment 24 in various ways. FIG. 2 illustrates a loop rack in each heating compartment that is supported by mounting brackets disposed on the side walls of the heating compartment. Thus, heating compartment 24 is shown with mounting brackets 45 and 47 supporting loop rack 244 above lower compartment surface 34. FIG. 2 also shows loop rack 244 supporting trays 40 and 42 covered with covers 246 and 248, respectively.

3. Exemplary Racks a. Post Rack

Figure 3:
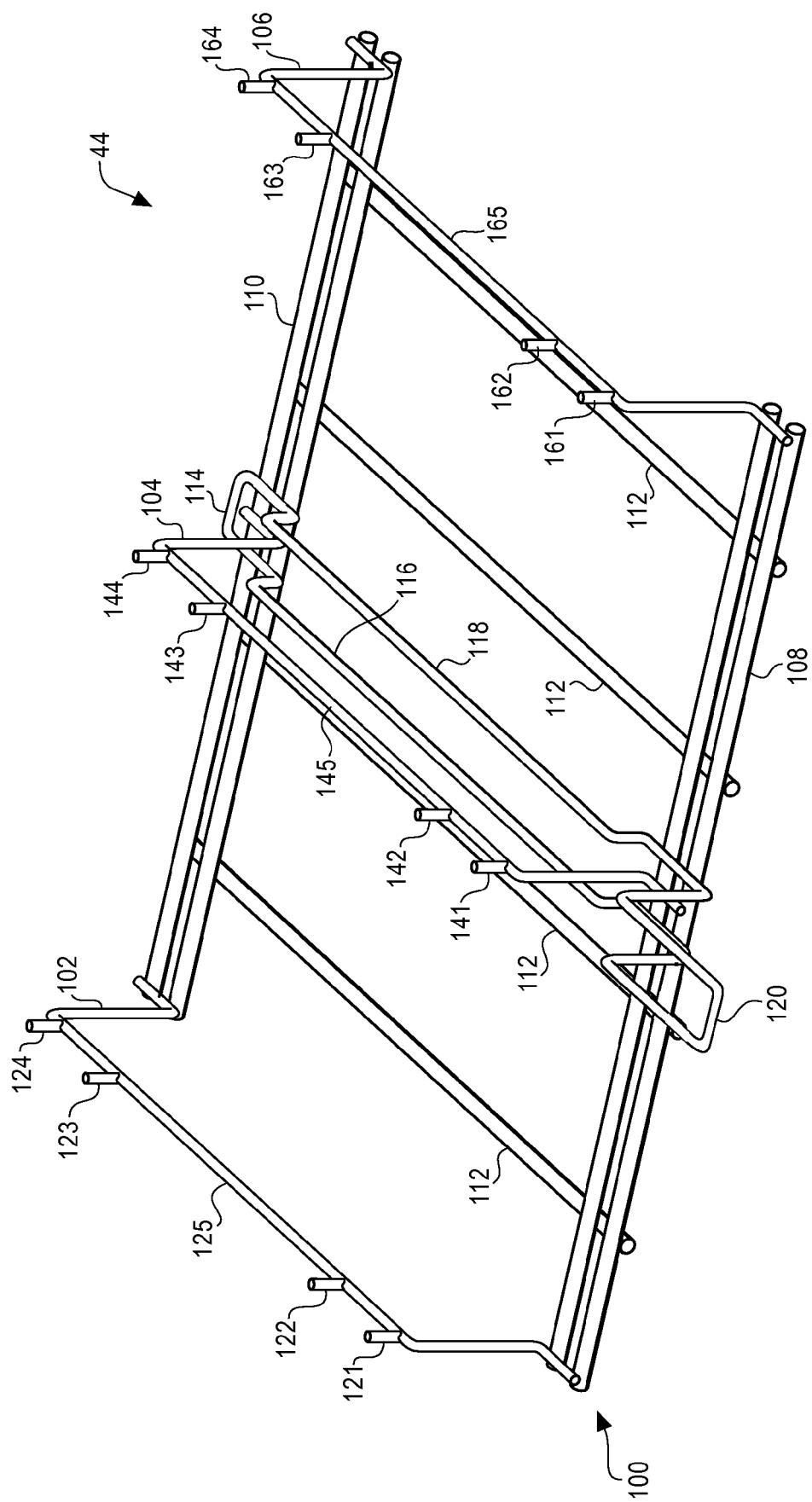
FIG. 3 is an isometric view of a post rack in accordance with an exemplary embodiment.
Figure 4:
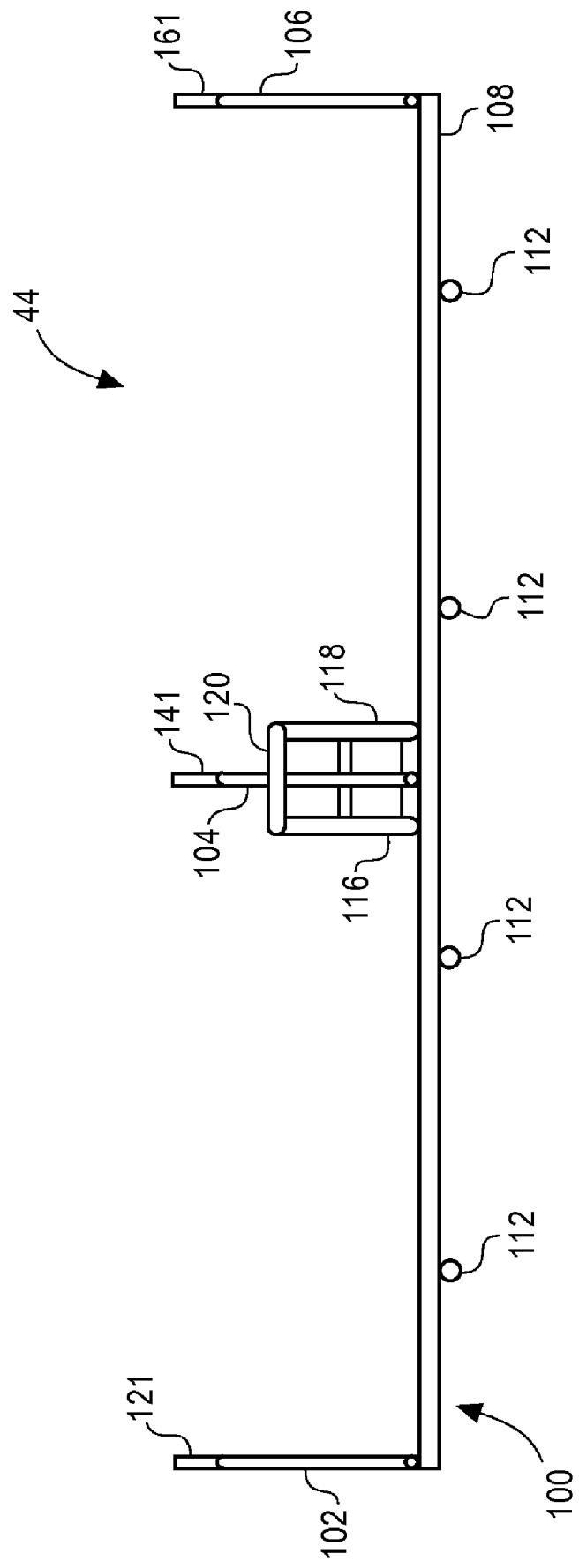
FIG. 4 is a front view of a post rack in accordance with an exemplary embodiment.
Figure 5:
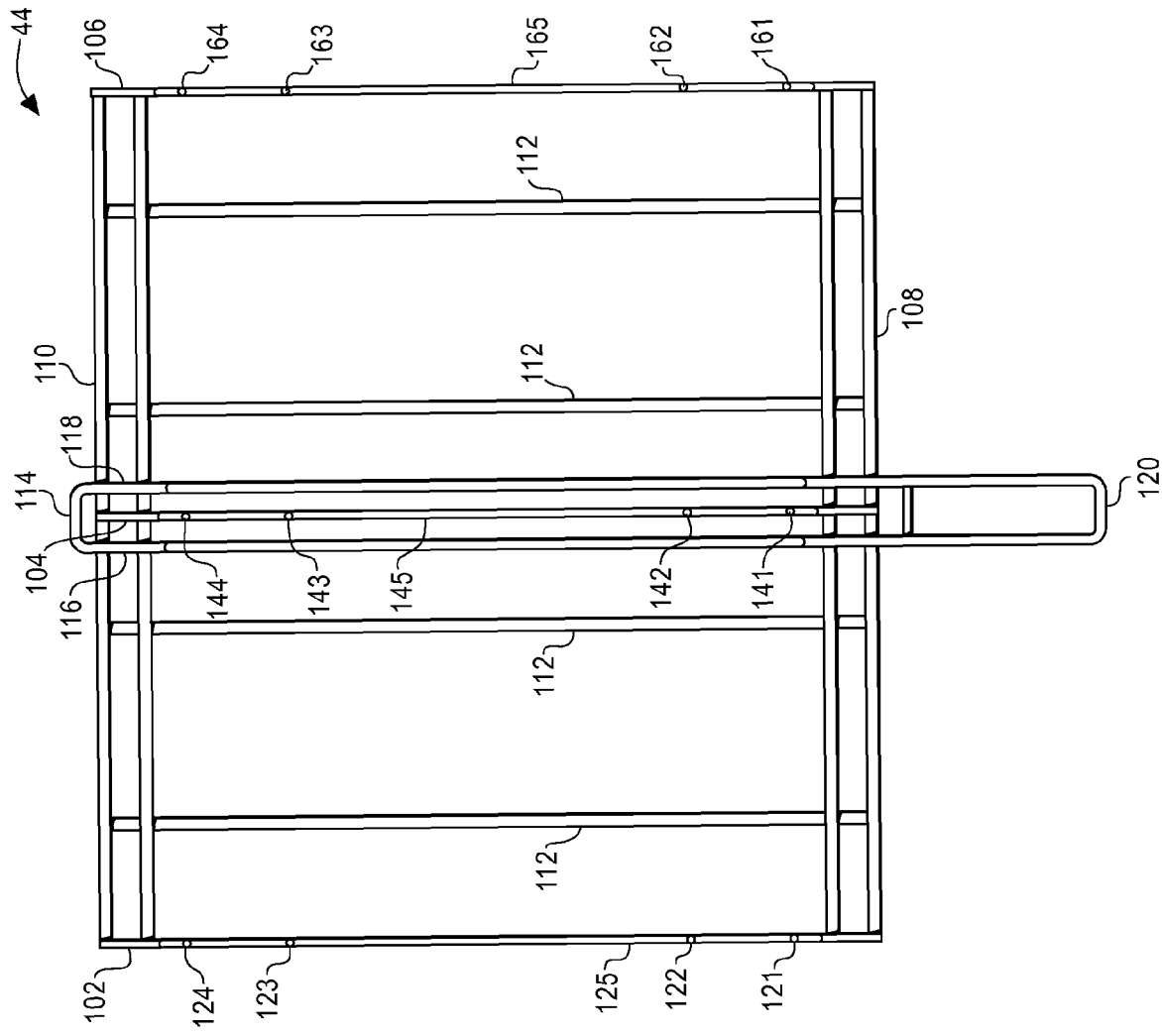
FIG. 5 is a top view of a post rack in accordance with an exemplary embodiment.

FIGS. 3, 4, and 5 are isometric, front, and top views, respectively, of post rack 44. As shown in FIGS. 3-5, post rack 44 includes a frame 100 and support brackets 102, 104 and 106 extending upwardly from frame 100. Frame 100 may be mounted in heating compartment 24 as shown in FIG. 1, i.e., supported by mounting brackets 45 and 47. Alternatively, frame 100 may rest on lower compartment surface 34.

The front of frame 100 may be defined by one or more laterally-extending front members 108, and the back of frame 100 may be defined by one or more laterally-extending back members 110. Frame 100 may further include a plurality of cross-pieces 112 extending between front members 108 and back members 110.

In an exemplary embodiment, support brackets 102, 104, and 106 extend between front members 108 and back members 110. The bottoms of support brackets 102, 104, and 106 are attached to front member 108 and to back member 110.

The generally horizontal tops of support brackets 102, 104 and 106 define stop members 125, 145, and 165, respectively. In this configuration, stop members 125 and 145 provide support for cover 46, and stop members 145 and 165 provide support for cover 48.

One or more guide members may extend upward from support brackets 102, 104, and 106. A guide member may be a post, shaft, bar, upright, or other structure. In an exemplary embodiment, posts 121, 122, 123, and 124 disposed on support brackets 102 function as guide members. Similarly, posts 141, 142, 143, and 144, disposed on support bracket 104, and posts 161, 162, 163, and 164, disposed on support bracket 106, function as guide members.

Post rack 44 also includes a divider 114 that divides the support space of post rack 44 into two separate receiving spaces to support each of trays 40 and 42. Divider 114 has divider members 116 and 118 extending between front member 108 and back member 110. It is to be understood a rack may include more than one divider to accommodate more than two trays or a rack may not include any dividers if a rack accommodates only one tray. Thus, tray 40 may be supported within heating compartment 24 between support bracket 102 and divider member 116 and tray 42 may be supported between divider member 118 and support bracket 106. Divider 114 may also extend in front of frame 100 to provide a handle 120. As shown in FIG. 1, handle 120 extends out of the open front of heating compartment 24. If the back of food warming apparatus 10 is open, handle 120 may extend out of the back of food warming apparatus 10.

b. Loop Rack

Figure 6:
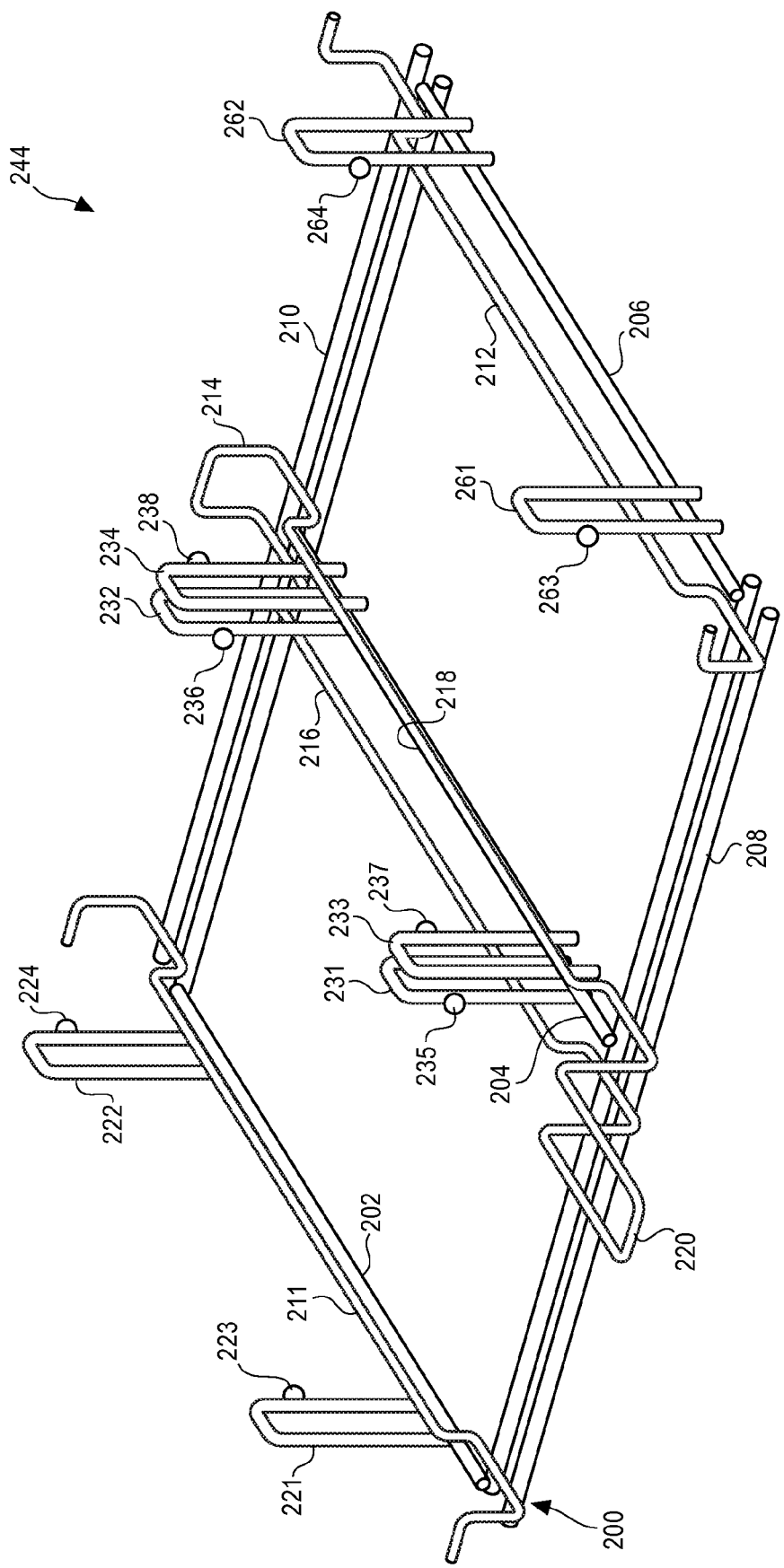
FIG. 6 is an isometric view of a loop rack in accordance with an exemplary embodiment.
Figure 7:
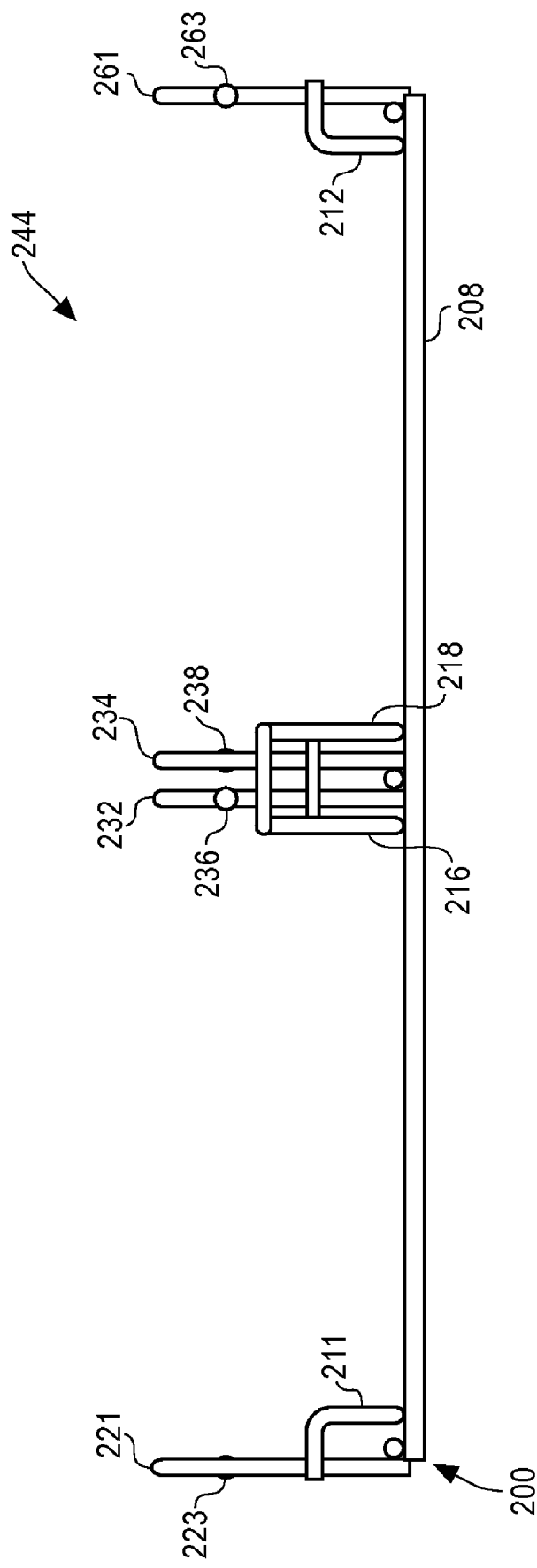
FIG. 7 is a front view of a loop rack in accordance with an exemplary embodiment.
Figure 8:
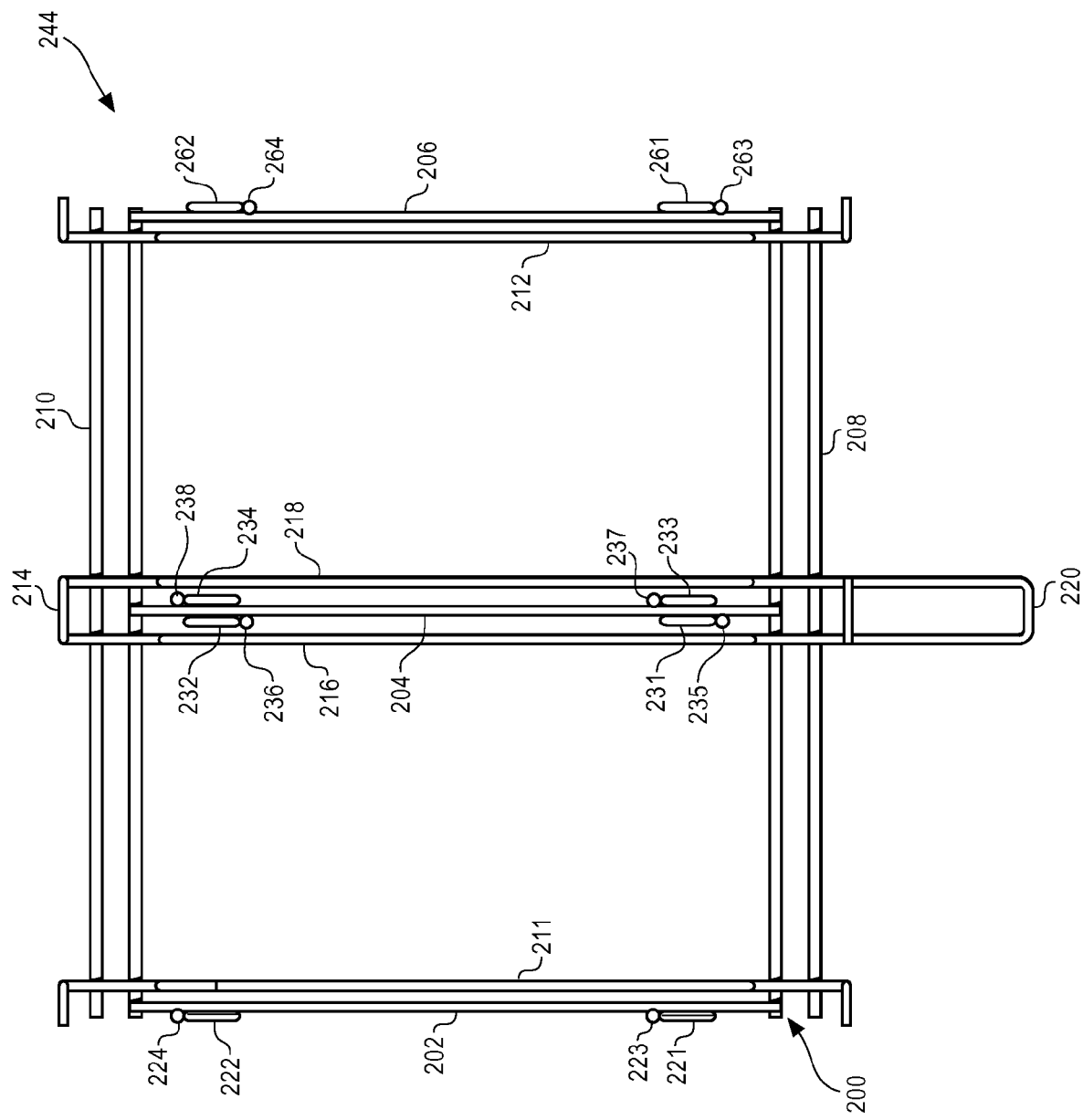
FIG. 8 is a top view of a loop rack in accordance with an exemplary embodiment.

FIGS. 6, 7, and 8 are isometric, front, and top views, respectively, of loop rack 244. As shown in FIGS. 6-8, loop rack 244 includes a frame 200. The front of frame 200 may be defined by one or more laterally-extending front members 208, the sides of frame 200 may be defined by side members 202 and 206, and the back of frame 200 may be defined by one or more laterally-extending back members 210. Frame 200 may further include one or more cross-pieces 204, 211, and 212 extending between front members 208 and back members 210, which serve to laterally position trays on rack 244.

In an exemplary embodiment, loops 221, 222, 231, 232, 233, 234, 261, and 262 function as guide members. Loops 221 and 222 extend vertically from side member 202, loops 231-234 extend vertically from cross-piece 204, and loops 261 and 262 extend vertically from side member 206.

In an exemplary embodiment, a stop member is disposed on each guide member. Loops 221, 222, 231, 232, 233, 234, 261, and 262 are configured with stop members 223, 224, 235, 236, 237, 238, 263, and 264, respectively. Each stop member may act as a support for a cover. In an exemplary embodiment, cover 246 may be supported by stop members 223, 224, 235, and 236, while cover 248 may be supported by stop members 237, 238, 263, and 264. While each guide member is shown as a loop disposed with one stop member, it is to be understood that any one guide member may have more or fewer stop members.

While the stop members are shown as a ball in the exemplary embodiment, a stop member could be any bulge, bump, bulb, knob, or other protrusion disposed on the guide member. Alternatively, the stop members for loop rack 244 could be one or more bars, as disposed on post rack 44, as described above. As another alternative, the stop members utilized on loop rack 244 could be disposed on post rack 44 instead of the bars shown therein.

Loop rack 244 also includes a divider 214 that divides the support space of post rack 244 into two separate receiving spaces to support each of trays 40 and 42. Divider 214 has divider members 216 and 218 extending between front member 208 and back member 210. It is to be understood that a rack may include more than one divider to accommodate more than two trays or a rack may not include any dividers if the rack only accommodates one tray. Thus, tray 40 may be supported within heating compartment 24 between cross-piece 211 and divider member 216 and tray 42 may be supported between divider member 218 and cross-piece 212. Divider 214 may also provide a handle 220. Handle 220 may extend out of the open front of heating compartment 24. If the back of food warming apparatus 10 is open, handle 220 may extend out of the back of food warming apparatus 10.

4. Exemplary Covers a. Post Rack Covers

Figure 9:
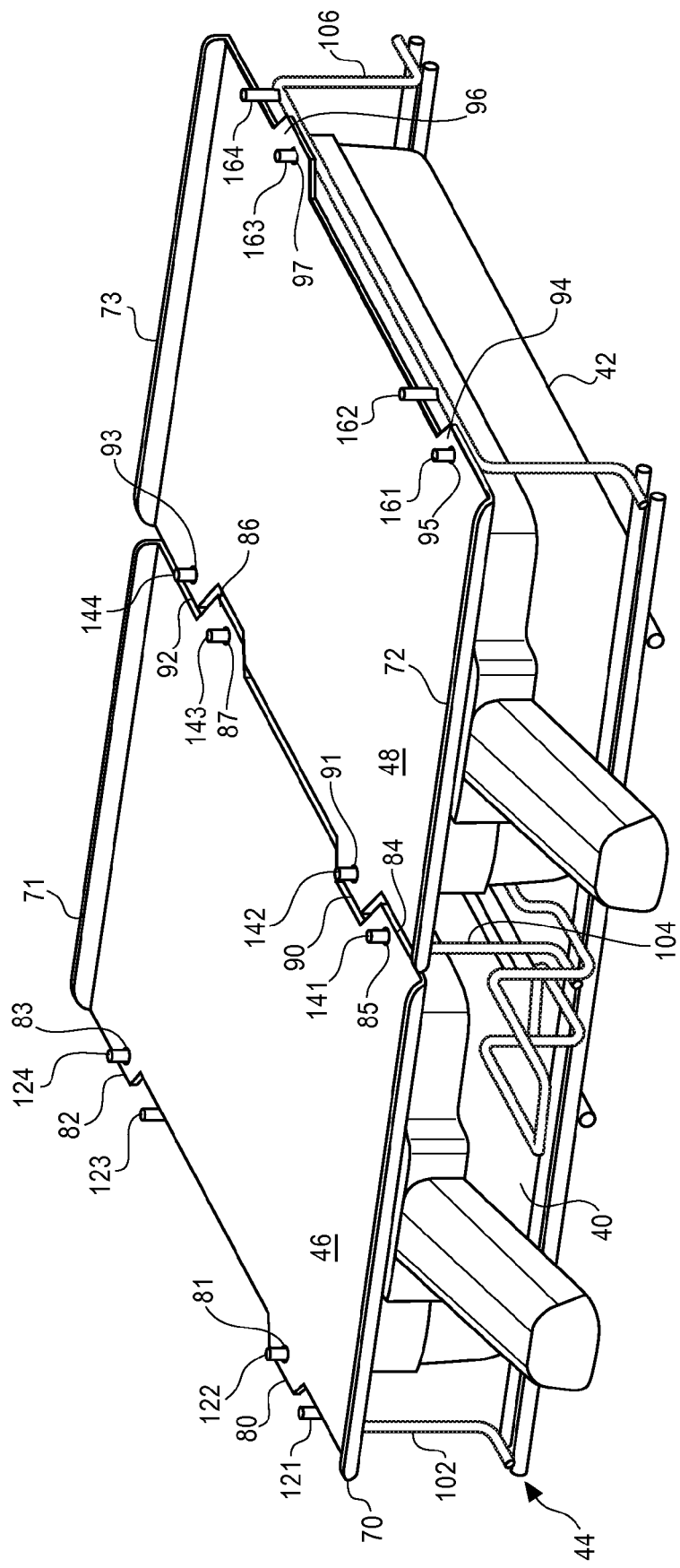
FIG. 9 is an isometric view of a post rack supporting two trays and two covers in accordance with an exemplary embodiment.
Figure 10:
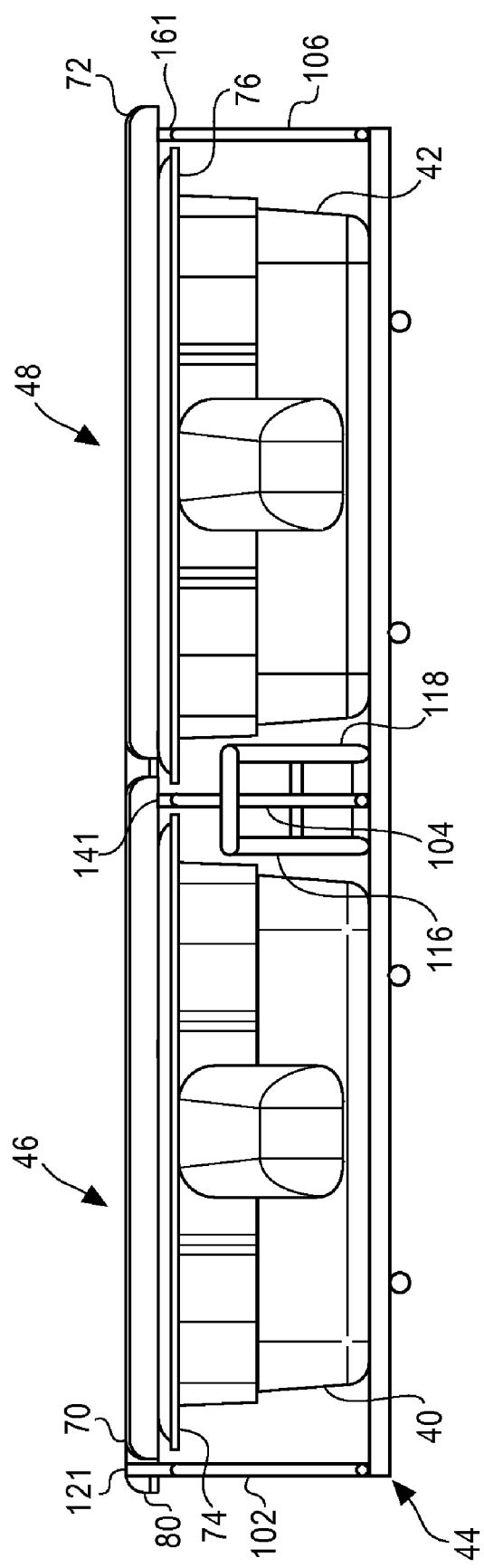
FIG. 10 is a front view of a post rack supporting two trays and two covers in accordance with an exemplary embodiment.

FIGS. 9 and 10 are isometric and front views, respectively, of a combination in which trays 40 and 42 are supported by post rack 44 and are covered by covers 46 and 48, respectively. In an exemplary embodiment, best shown in FIG. 9, cover 46 includes engagement sections 80, 82, 84 and 86 and cover 48 includes engagement sections 90, 92, 94, and 96.

In the embodiment shown in FIGS. 9 and 10, each engagement section includes a hole that surrounds a corresponding post, where each post acts as a guide member. Thus, as best shown in FIG. 9, cover 46 has engagement sections 80, 82, 84, 86 with holes 81, 83, 85, and 87, respectively. On the left side of cover 46, holes 81 and 83 engage posts 122 and 124, respectively. On the right side of cover 46, holes 85 and 87 engage posts 141 and 143, respectively. On the left side of cover 48, holes 91 and 93 engage posts 142 and 144, respectively. On the right side of cover 48, holes 95 and 97 engage posts 161 and 163, respectively. A hole may be an aperture, cut, slice, notch, or other type of opening in the cover that partially surrounds and engages a guide member.

In an exemplary embodiment, covers 46 and 48 are made out of a sheet material. The sheet material could be a metal, such as stainless steel, aluminum, or titanium, with a thickness ranging from about 0.024 inches to about 0.125 inches, depending on the type of metal. A metal cover could be anodized black or other color based, for example, on desired thermal characteristics. It is to be understood that covers 46 and 48 could also be made out of other materials, such as plastics (e.g., high temperature Nylon, polysulfone, polyimide, polyethersulfone, polyetherimide, or polyphenylene sulfide), depending on the operating temperatures that the covers experience.

To construct a cover out of a sheet material, a generally rectangular piece of the sheet material may be cut and holes punched in the sheet material to accommodate the guide members. The two free edges of the sheet material may also be bent to provide additional stiffness. As best shown in FIG. 9, cover 46 may include a front turned-up edge 70 and a back turned-up edge 71, and cover 48 may include a front turned-up edge 72 and a back turned-up edge 73. Preferably, turned-up edges 70-73 do not contact upper compartment surface 32 when covers 46 and 48 are in heating compartment 24.

In the configuration shown in FIGS. 9 and 10, covers 46 and 48 rest on trays 40 and 42, respectively, rather than on stop members 125, 145, and 165. In particular, as best shown in FIG. 10, tray 40 includes a lip 74 that extends above stop members 125 and 145 and tray 42 includes a lip 76 that extends above stop members 145 and 165.

Figure 11:
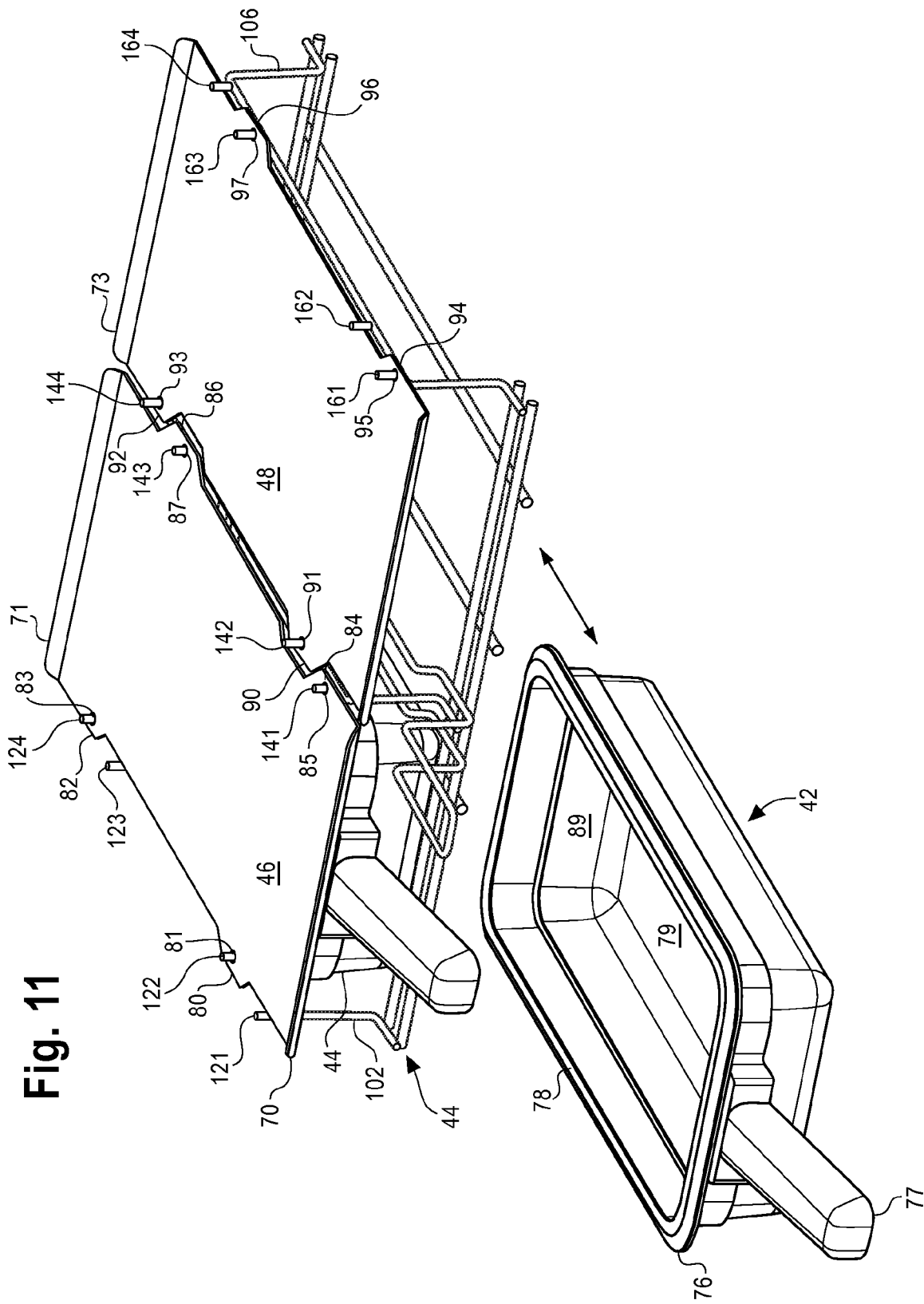
FIG. 11 is an isometric view of a post rack supporting one tray and two covers in accordance with an exemplary embodiment.
Figure 12:
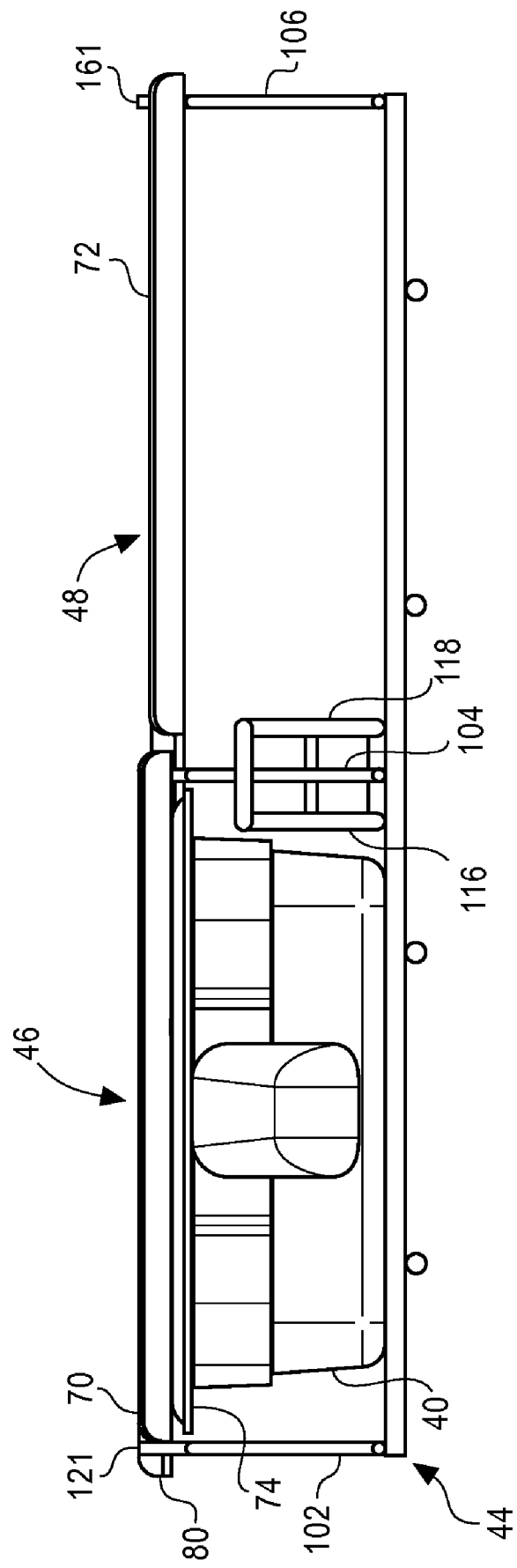
FIG. 12 is a front view of a post rack supporting one tray and two covers in accordance with an exemplary embodiment.

FIGS. 11 and 12 illustrate how cover 48 changes position when tray 42 is withdrawn from heating compartment 24. As best shown in FIG. 12, with tray 42 no longer supporting cover 48, cover 48 rests on stop members 145 and 165. Also, covers 46 and 48 may move independently of each other. As best shown in FIG. 12, cover 46 is shown resting on lip 74 of tray 40.

When tray 42 is withdrawn, cover 48 stays in heating compartment 24 because posts 142, 144, 161, and 163 function as guide members. In particular, when tray 42 is pulled forward, cover 48 will fall and may be pulled with tray 42. The vertical motion of cover 48 is guided by posts 142, 144, 161, and 163 disposed in holes 91, 93, 95, and 97 until cover 48 reaches stop members 145 and 165. Further, if cover 48 is pulled with tray 42, the horizontal motion of cover 48 is arrested by the engagement of holes 91, 93, 95, and 97 with posts 142, 144, 161 and 163, respectively.

In the configuration illustrated in FIGS. 11 and 12, cover 48 and post rack 44 cooperatively define a receiving space into which tray 42 can be inserted. The receiving space is defined above by cover 48, defined below by front member 108 and back member 110, and defined along the sides by divider member 118 and side member 106. However, the height of tray 42 is greater than the height of the receiving space, i.e., the distance between front member 108 and cover 48. As a result, when tray 42 is inserted into the receiving space, holes 91, 93, 95 and 97 engage posts 142, 143, 161, and 163, respectively, allowing posts 142, 143, 161, and 163 to guide the upward motion of cover 48. When tray 42 has been fully inserted, cover 48 will again rest on lip 76, as shown in FIGS. 9 and 10.

The double-headed arrow in FIG. 11 shows the directions in which tray 42 may be inserted and withdrawn from under cover 48. Tray 42 may include a handle 77 to facilitate its movement in the directions indicated by the double-headed arrow. FIG. 11 shows that lip 76 may surround a top opening 78 that provides access to the interior of tray 42. The interior of tray 42 defines a space that may be used to contain previously cooked food portions. The height of this interior space may be defined by the distance between a generally flat bottom wall 79 of tray 42 and the upper surface of lip 76. The sides of the interior space may be defined by four side walls 89 that extend between bottom wall 79 and lip 76.

When a tray is inserted into a receiving space, the cover may partially or completely block the top opening of the tray. In an exemplary embodiment, when tray 42 is inserted into the receiving space, cover 48 will rest on lip 76 and will at least partially block top opening 78. In this position, cover 48 will restrict the evaporation of liquid from previously cooked food items contained in the interior of tray 42.

b. Loop Rack Covers

Figure 13:
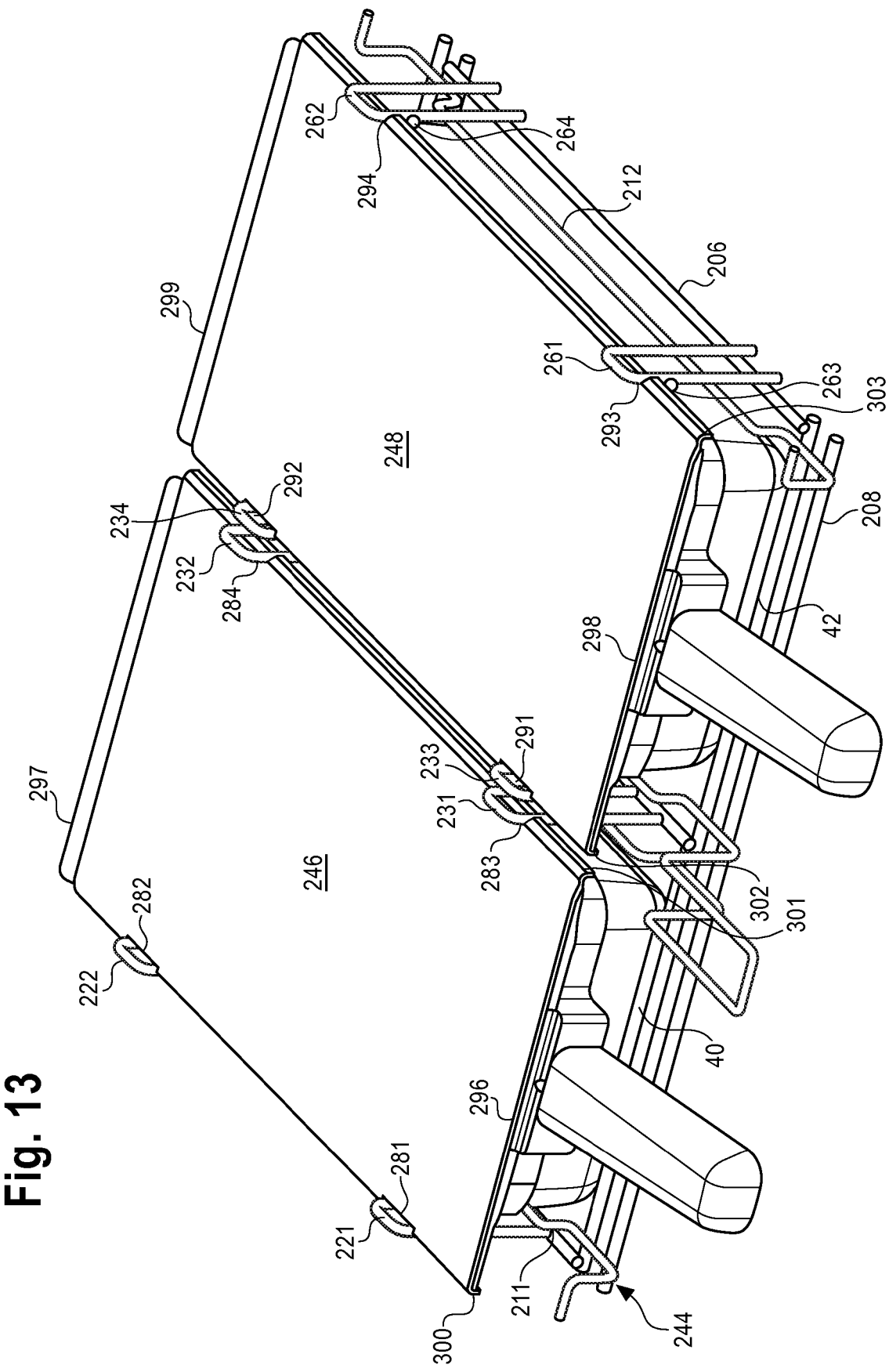
FIG. 13 is an isometric view of a loop rack supporting two trays and two covers in accordance with an exemplary embodiment.
Figure 14:
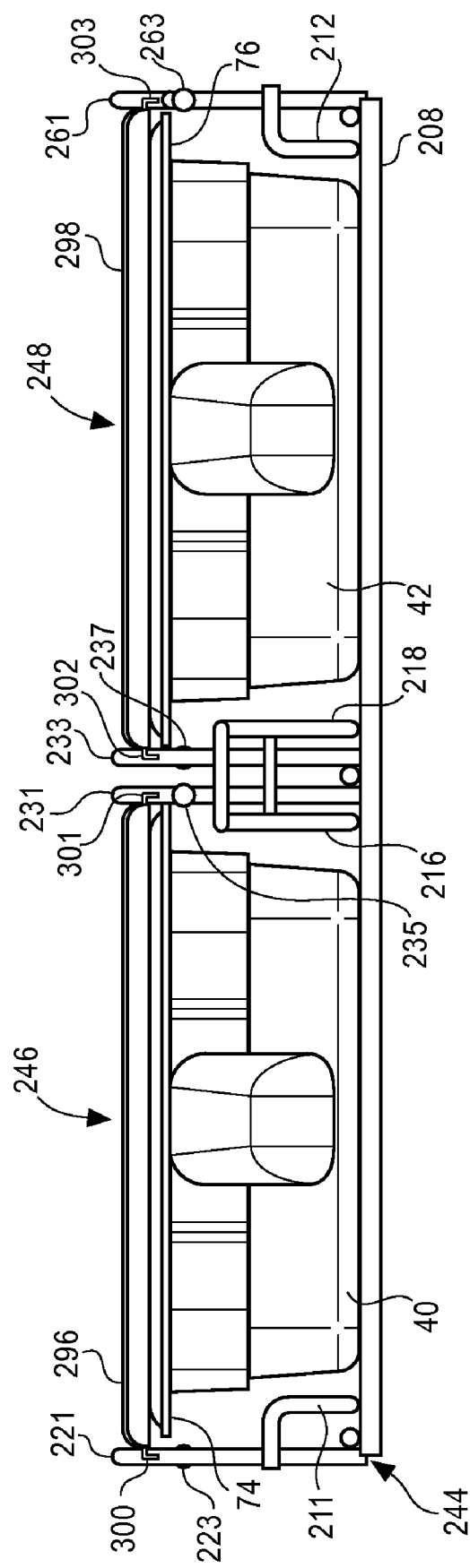
FIG. 14 is a front view of a loop rack supporting two trays and two covers in accordance with an exemplary embodiment.

FIGS. 13 and 14 are isometric and front views, respectively, of a combination in which trays 40 and 42 are supported by loop rack 244 and are covered by covers 246 and 248, respectively.

Each cover may include one or more engagement sections that engage the guide members of loop rack 244. In the exemplary embodiment shown in FIGS. 13 and 14, covers 246 and 248 have engagement sections with notches that receive and engage loops, where the loops are acting as guide members. As best shown in FIG. 13, cover 246 has notches 281, 282, 283, and 284. On the left side of cover 246, notches 281 and 282 engage loops 221 and 222, respectively. On the right side of cover 246, notches 283 and 284 engage loops 231 and 232, respectively. On the left side of cover 248, notches 291 and 292 engage loops 233 and 234, respectively. On the right side of cover 248, notches 293 and 294 engage guide members 261 and 262, respectively.

Alternatively, a cover could be fashioned with holes but without engagement sections. A hole may be an aperture, cut, slice, notch, or other type of opening in the cover that partially surrounds the guide member. Further, a cover could be fashioned with holes instead of notches. A notch may be an aperture, cut, slice, hole, or other type of opening in the cover that partially surrounds the guide member.

Covers 246 and 248 may be made of the same sheet materials as described above for covers 46 and 48. To provide additional stiffness, cover 246 may have a turned-up front edge 296 and a turned-up back edge 297. Similarly, cover 248 may have a turned-up front edge 298 and a turned-up back edge 299. However, the sides of the covers may be turned down so as to provide edges that contact the stop members. Thus, cover 246 may have turned-down sides 300 and 301, and cover 248 may have turned-down sides 302 and 303.

In the configuration shown in FIGS. 13 and 14, covers 246 and 248 are supported by trays 40 and 42, respectively, not loop rack 244. In particular, as best shown in FIG. 14, lip 74 of tray 40 extends above stop members 223 and 235 disposed on loops 221 and 231, respectively, and lip 76 of tray 42 extends above stop members 237 and 263 disposed on loops 233 and 261, respectively.

Figure 15:
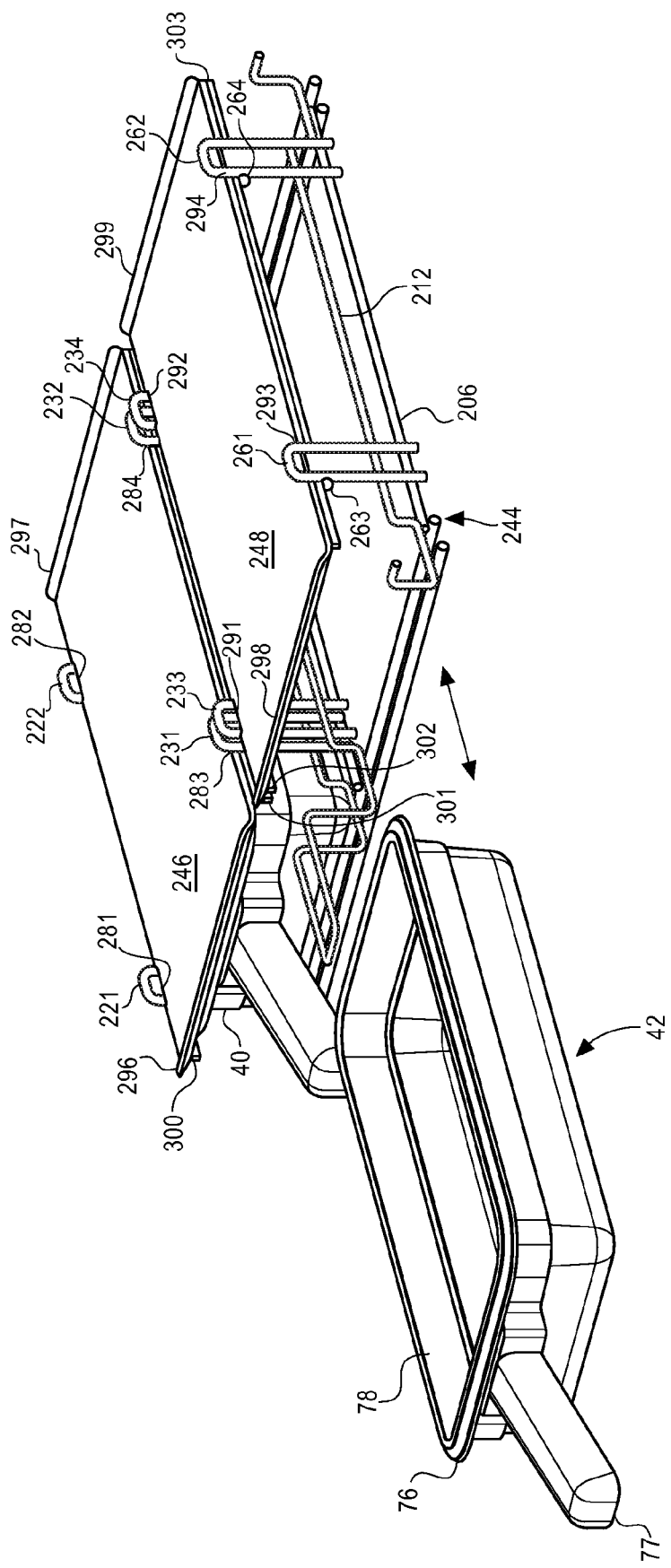
FIG. 15 is an isometric view of a loop rack supporting one tray and two covers in accordance with an exemplary embodiment.
Figure 16:
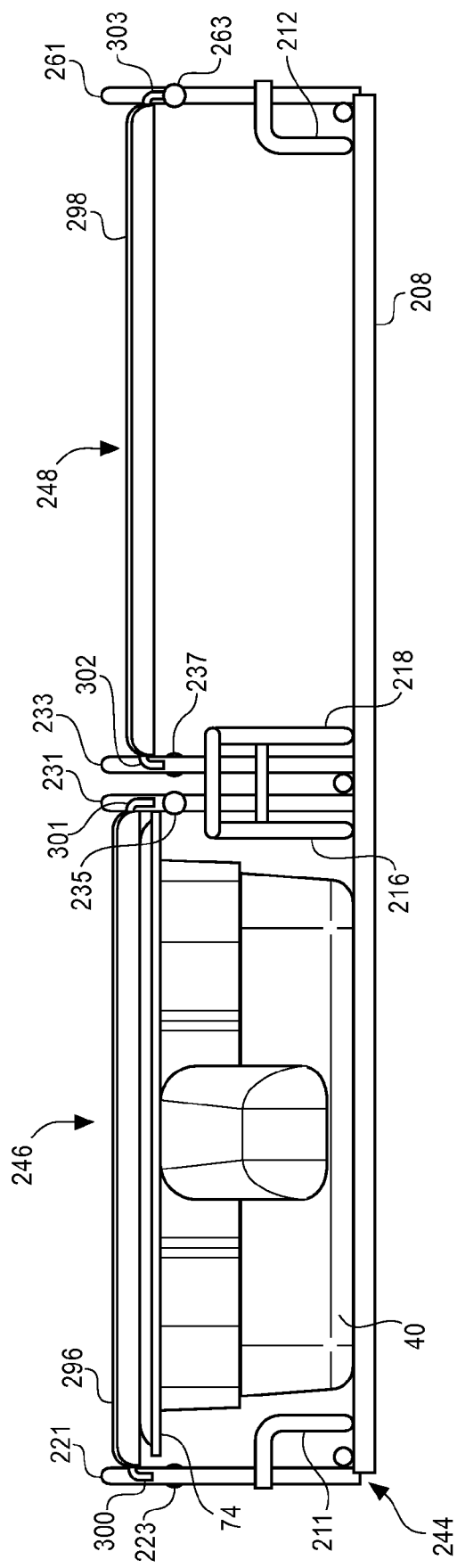
FIG. 16 is a front view of a loop rack supporting one tray and two covers in accordance with an exemplary embodiment.

FIGS. 15 and 16 illustrate how the position of cover 248 changes when tray 42 is withdrawn from heating compartment 24. As best shown in FIG. 16, with tray 42 no longer supporting cover 248, cover 248 rests on stop members 237, 238, 263 and 264. Also, covers 246 and 248 move independently of each other. As best shown in FIG. 16, cover 246 is shown resting on lip 74 of tray 40.

When tray 42 is withdrawn, cover 248 stays in heating compartment 24 because loops 233, 234, 261, and 262 function as guide members. In particular, when tray 42 is pulled forward, cover 248 will fall and may be pulled with tray 42. The vertical motion of cover 248 is guided by loops 233, 234, 261, and 262 disposed in notches 291, 292, 293, and 294, respectively, until cover 248 reaches stop members 237, 238, 263 and 264. Further, if cover 48 is pulled with tray 42, the horizontal motion of cover 48 arrested by the engagement of notches 291, 292, 293, and 294 with loops 233, 234, 261, and 262, respectively. In this way, loops 233, 234, 261, and 262 retain cover 248 in heating compartment 24.

In the configuration illustrated in FIGS. 15 and 16, cover 248 and loop rack 244 cooperatively define a receiving space into which tray 42 can be inserted. The receiving space is defined above by cover 248, defined below by front member 208 and back member 210, and defined along the sides by divider member 218 and cross-piece 212. However, the height of tray 42 is greater than the height of the receiving space, i.e., the distance between front member 208 and cover 248. As a result, when tray 42 is inserted into the receiving space, notches 291, 292, 293, and 294 engage loops 233, 234, 261, and 262, respectively, allowing loops 233, 234, 261, and 262 to guide the upward motion of cover 48. When tray 42 has been fully inserted, cover 248 will again rest on lip 76, as shown in FIGS. 13 and 14.

The double-headed arrow in FIG. 15 shows the directions in which tray 42 may be inserted and withdrawn from under cover 248. When tray 42 is inserted into the receiving space, cover 248 may block top opening 78 of tray 42. In an exemplary embodiment, when tray 42 is inserted into the receiving space, cover 248 will rest on lip 76 and will at least partially block top opening 78. In this position, cover 248 will restrict the evaporation of liquid from previously cooked food items contained in the interior of tray 42.

5. Exemplary Method of Use

When tray 42 contains previously cooked food portions, tray 42 may be inserted under either cover 48 or cover 248 in heating compartment 24 of food warming apparatus 10 in order to maintain the previously cooked food portions in a ready-to-use condition. In particular, heating compartment 24 may be heated to maintain the previously cooked food portions at a desired holding temperature, as described above. In addition, cover 48 or cover 248 may, at least partially, block top opening 78 of tray 42 and restrict evaporation of liquid from the previously cooked food portions.

When using covers 46 and 48 of tray 42, post rack 44 is used as well. Post rack 44 supports cover 46 using posts 122, 124, 141 and 143 and stop members 125 and 145. Cover 46 has holes 81, 83, 85, and 87 to engage posts 122, 124, 141 and 143, respectively. Post rack 44 supports cover 48 using posts 142, 144, 161 and 163 and stop members 145 and 165. Cover 48 has holes 91, 93, 95, and 97 to engage posts 142, 144, 161, and 163, respectively.

Similarly, when using covers 246 and 248 of tray 42, loop rack 244 is used as well. Loop rack 244 supports cover 246 using loops 221, 222, 231 and 232 and stop members 223, 224, 235 and 236. Cover 246 has notches 281, 282, 283, and 284 to engage loops 221, 222, 231 and 232, respectively. Loop rack 244 supports cover 248 using loops 233, 234, 261 and 262 and stop members 237, 238, 263 and 264. Cover 248 has notches 291, 292, 293, and 294 to engage loops 233, 234, 261 and 262, respectively.

Tray 42 may be withdrawn from heating compartment 24 in order to use one or more of the previously cooked food portions, for example, to prepare a food item ordered by a customer. In particular, withdrawing tray 42 from heating compartment 24 allows an operator access to the previously cooked food portions through the top opening 78 of tray 42.

Covers 46 and 48 may be periodically removed from heating compartment 24, for example, in order to clean them. To remove covers 46 and 48, trays 40 and 42 may first be withdrawn from heating compartment 24. Then, post rack 44 may be pulled out of compartment 24, e.g., using handle 120, with covers 46 and 48 still mounted thereon. Once post rack 44 has been withdrawn, covers 46 and 48 may be lifted off. Covers 246 and 248 may be removed from heating compartment 24 in a similar fashion to covers 46 and 48, by removing trays 40 and 42, pulling loop rack 244 out of heating compartment 24 (which may include the use of handle 220), and lifting covers 246 and 248 from loop rack 244.

Trays 40 and 42, post rack 44, and covers 46 and 48 may be assembled in heating compartment 24 in the following way. First, covers 46 and 48 are mounted on post rack 44. More particularly, as may be seen in FIG. 9, cover 46 is mounted on post rack 44 by fitting posts 122, 124, 141, and 143 through surrounding holes 81, 83, 85, and 87, respectively, so that cover 46 rests on stop members 125 and 145. Similarly, cover 48 is mounted on post rack 44 by fitting posts 142, 144, 161, and 163 through holes 91, 93, 95, and 97, respectively, so that cover 48 rests on stop members 145 and 165.

In a similar fashion, trays 40 and 42, loop rack 244, and covers 246 and 248 may be assembled in heating compartment 24. First, covers 246 and 248 are mounted on loop rack 244. More particularly, as may be seen in FIG. 13, cover 246 is mounted on loop rack 244 by fitting loops 221, 222, 231, and 232 through partially surrounding notches 281, 282, 283, and 284, respectively, so that cover 246 rests on stop members 223, 224, 235, and 236. Similarly, cover 248 is mounted on post rack 244 by fitting loops 233, 234, 261, and 262 through notches 291, 292, 293, and 294, respectively, so that cover 248 rests on stop members 237, 238, 263, and 264.

Once covers 46 and 48 have been mounted in this way, post rack 44 or loop rack 244 may be inserted into heating compartment 24 through the front 18 of food warming apparatus 10, e.g., using handle 120 for post rack 44 or handle 220 for loop rack 244, so that frame 100 for post rack 44 or frame 200 for loop rack 244 is supported by lower compartment surface 34. If the back 20 of food warming apparatus 10 is open, post rack 44 or loop rack 244 may be inserted into the back of heating compartment 24. Either post rack 44 or loop rack 244 rack may be supported by lower heating compartment surface 34, by mounting brackets 45 and 47 above lower heating compartment surface 34, or in some other way. Then, trays 40 and 42 may be inserted into the front of heating compartment 24 by sliding them over frame member 108 of post rack 44 or frame member 208 of loop rack 244. If the back 20 of food warming apparatus 10 is open, trays 40 and 42 may be inserted into the back of heating compartment 24 by sliding them over frame member 110 of post rack 44 or frame member 210 of loop rack 244.

For post rack 44, the insertion of trays 40 and 42 into heating compartment 24 lifts up covers 46 and 48, as described above, to attain the configuration illustrated in FIGS. 9 and 10. Upon insertion of tray 40, posts 122, 124, 141, and 143 acting as guide members may guide cover 46 upward. Similarly, upon insertion of tray 42, posts 142, 144, 161, and 163 acting as guide members may guide cover 48 upward.

The removal of trays 40 and 42 from heating compartment 24 lowers covers 46 and 48, as described above. Upon removal of tray 40, posts 122, 124, 141, and 143 may guide cover 46 downward. Similarly, upon removal of tray 42, guide members 142, 144, 161, and 163 may guide cover 48 downward.

For loop rack 244, the insertion of trays 40 and 42 into heating compartment 24 lifts up covers 246 and 248, as described above, to attain the configuration illustrated in FIGS. 13 and 14. Upon insertion of tray 40, loops 221, 222, 231 and 232 acting as guide members may guide cover 246 upward. Similarly, upon insertion of tray 42, loops 233, 234, 261, and 262 acting as guide members may guide cover 248 upward.

The removal of trays 40 and 42 from heating compartment 24 lowers covers 246 and 248, as described above. Upon removal of tray 40, loops 221, 222, 231 and 232 may guide cover 246 downward. Similarly, upon removal of tray 42, loops 233, 234, 261, and 262 may guide cover 248 downward.

6. Conclusion

While certain features and embodiments of the present invention have been described in detail herein, it is to be understood that the invention encompasses all modifications and enhancements within the scope and spirit of the following claims.

What is claimed is:

1. A food warming apparatus for maintaining previously cooked food portions contained in at least one tray in a ready-to-use condition, said at least one tray having a lip defining a tray opening, said food warming apparatus comprising:
   a cabinet having at least one heating compartment therein;
   a support disposed in said at least one heating compartment, said support including at least one stop member and at least one guide member;
   at least one cover in a first position resting on said at least one stop member, said at least one cover and said support cooperatively defining at least one receiving space within said at least one heating compartment for receiving said at least one tray; and
   at least one engagement section in said at least one cover engaging said at least one guide member such that said at least one guide member is able to guide upward movement of said at least one cover from said first position to a second position when said at least one tray is inserted into said at least one receiving space.

2. The food warming apparatus of claim 1, wherein said at least one engagement section at least partially surrounds said at least one guide member.

3. The food warming apparatus of claim 2, wherein said at least one guide member comprises a post, and wherein said at least one engagement section defines a hole that receives said post.

4. The food warming apparatus of claim 2, wherein said at least one guide member comprises a loop, and wherein said at least one engagement section defines a recess that receives said loop.

5. The food warming apparatus of claim 2, wherein said at least one engagement section comprises a first plurality of engagement sections on a first side of said at least one cover and a second plurality of engagement sections on a second side of said at least one cover, said second side being opposite said first side, and wherein said at least one guide member comprises a first plurality of guide members engaged by said first plurality of engagement sections and a second plurality of guide members engaged by said second plurality of engagement sections.

6. The food warming apparatus of claim 1, wherein when said at least one cover is in said second position said at least one cover at least partially blocks said tray opening so as to restrict evaporation of liquid from said previously cooked food portions contained in said at least one tray.

7. The food warming apparatus of claim 6, wherein when said at least one cover is in said second position said at least one cover rests on said lip of said at least one tray.

8. The food warming apparatus of claim 1, wherein said at least one guide member is able to guide downward movement of said at least one cover from said second position to said first position when said at least one tray is removed from said at least one heating compartment.

9. The food warming apparatus of claim 1, wherein said support comprises a frame, said frame having a front side and a back side.

10. The food warming apparatus of claim 9, wherein said at least one stop member comprises at least one bracket extending between said front side and said back side.

11. The food warming apparatus of claim 10, wherein said at least one guide member comprises at least one post extending upwardly from said bracket.

12. The food warming apparatus of claim 9, wherein said at least one guide member comprises at least one loop extending upwardly from said frame.

13. The food warming apparatus of claim 12, wherein said at least one stop member comprises at least one protrusion disposed on said at least one loop.

14. The food warming apparatus of claim 1, wherein said at least one cover comprises a first cover and a second cover, and wherein said at least one guide member comprises a first plurality of guide members engaged by a first plurality of engagement sections in said first cover and a second plurality of guide members engaged by a second plurality of engagement sections in said second cover, whereby said first and second covers are able to move upwardly and downwardly independently of each other.

15. The food warming apparatus of claim 1, wherein said at least one cover is metal.

16. The food warming apparatus of claim 1, further comprising at least one heater plate for heating said at least one heating compartment.

* * * * *